United States Patent [19]

Dunning

[11] Patent Number: 4,490,199
[45] Date of Patent: Dec. 25, 1984

[54] METHOD AND APPARATUS FOR SPLICING POLYMERIC WEBS

[75] Inventor: Frederick G. Dunning, Richmond, Va.

[73] Assignee: Allied Corporation, Morris Township, Morris County, N.J.

[21] Appl. No.: 394,064

[22] Filed: Jul. 1, 1982

[51] Int. Cl.³ .................. B29C 27/08; B65H 69/08
[52] U.S. Cl. .................. 156/73.4; 156/157; 156/290; 156/358; 156/366; 156/502; 156/504; 156/580.1
[58] Field of Search ........ 156/73.4, 73.1, 157, 156/580.1, 580.2, 504, 290, 358, 366, 502

[56] References Cited

U.S. PATENT DOCUMENTS

| | | |
|---|---|---|
| 3,445,307 | 5/1969 | Balamuth et al. ............ 156/73.4 |
| 3,560,312 | 2/1971 | Smith ............................ 156/504 |
| 3,574,037 | 4/1971 | Deans et al. ................. 156/73.4 |
| 3,687,786 | 8/1972 | Williams et al. ............ 156/580.1 |
| 3,737,361 | 6/1973 | Obeda ......................... 156/580.1 |

FOREIGN PATENT DOCUMENTS 517673  10/1976  U.S.S.R. ...................... 156/580.1

*Primary Examiner*—Michael Wityshyn
*Attorney, Agent, or Firm*—Richard A. Negin; Jay P. Friedenson; Richard A. Anderson

[57] ABSTRACT

An apparatus and method of splicing polymeric webs using an ultrasonic welder and a web support means. There is a means to secure the trailing end of at least one first web and the leading end of at least one second web between the ultrasonic welder and the web support means. The trailing end of the first web and the leading end of the second web overlap between the ultrasonic welder and the web support means and are welded together.

15 Claims, 2 Drawing Figures

METHOD AND APPARATUS FOR SPLICING POLYMERIC WEBS

DESCRIPTION

BACKGROUND OF THE INVENTION

This invention is in the field of sheet and web-like material; more particularly, the invention relates to a method and apparatus for splicing polymeric webs.

Polymeric web materials are used in a variety of manufacturing processes. Typically, a polymeric web is stored in a roll. The leading edge of a roll polymeric web is fed into a manufacturing process. The processing can include a variety of operations which include, but are not limited to, treatment of the surface of the polymeric web, lamination of the polymeric web to other webs, formation or shaping of the polymeric web, embossing the surface of the polymeric web, and the like. A typical process in which polymeric webs are fed through a manufacturing line to form a multiple layer stampable thermoplastic laminate is disclosed in U.S. Pat. No. 4,240,857, hereby incorporated by reference. Other processes for forming laminates and articles using rolls of polymeric material are disclosed in U.S. Pat. Nos. 3,222,237 and 3,504,074, both hereby incorporated by reference.

SUMMARY OF THE INVENTION

The present invention is an apparatus and method of splicing polymeric webs. The polymeric web has an axial direction, a transverse direction, a leading end, and a trailing end. The apparatus has an ultrasonic welder and web support means. There is a means to secure the trailing end of at least one first web and the leading end of at least one second web between the ultrasonic welder and the web support means. The trailing end of the first web and the leading end of the second web overlap between the ultrasonic welder and the web support means.

In a preferred embodiment of the apparatus of the present invention, the ultrasonic welder is a spot welder. Additionally, the preferred embodiment has an indexing means to control the spot welder to form a plurality of spot welds transversely across the web. The indexing means further comprises a means to move the spot welder transversely across the web, and a means to control the distance between the welds. A welder controller means controls the time of heating and the time that pressure is exerted at each weld. There can be a means to move the apparatus in a direction parallel to the axial direction of the web.

The present invention includes a method of splicing polymeric webs having an axial direction, a transverse direction, a leading end, and a trailing end using an ultrasonic welder and a web support means. The trailing end of at least one first polymeric web is fed between the ultrasonic welder and the web support means. The leading end of at least one second polymeric web is fed between the ultrasonic welder and the web support means. The trailing end of the first polymeric web and the leading end of the second polymeric web overlap. The first polymeric web and the second polymeric web are secured in position with the overlapping portion of the trailing end of the first web and the leading end of the second web located between the ultrasonic welder and the web support means. The ultrasonic welder is brought into contact with one side of the overlapping polymeric webs. The web support means is opposite the ultrasonic welder and in contact with the opposite side of the overlapping polymeric webs. The overlapping polymeric webs are heated with the ultrasonic welder and fused together between the ultrasonic heater and the web support means. Preferably, the ultrasonic welder heats the polymeric material in the polymeric web to a temperature above the melt temperature and exerts a pressure on the webs causing them to fuse together.

Preferably, the welder is located between a trailing end clamp and a leading end clamp. The step of securing the first polymeric web and the second polymeric web further comprises clamping the first polymeric web with the trailing end clamp, the trailing end being between the ultrasonic welder and the support means, and clamping the second polymeric web with the leading end clamp, the leading end being between the ultrasonic welder and the support means. The first polymeric web and the second polymeric web overlap between the ultrasonic welder and the support means. Preferably, the ultrasonic welder is the type that welds at least one spot and is indexed to move transversely across the web. As the welder moves transversely across the web, it repeatedly stops to spot weld the overlapping polymeric webs together by repeating the steps of bringing the ultrasonic welder into contact with one side of the overlapping polymeric webs with the web support means in contact with the opposite side of the polymeric webs, heating the overlapping polymeric webs with the ultrasonic welder and fusing, preferably by pressure, the heated overlapping polymeric webs together.

DESCRIPTION OF THE PREFERRED EMBODIMENTS

Figure 1:
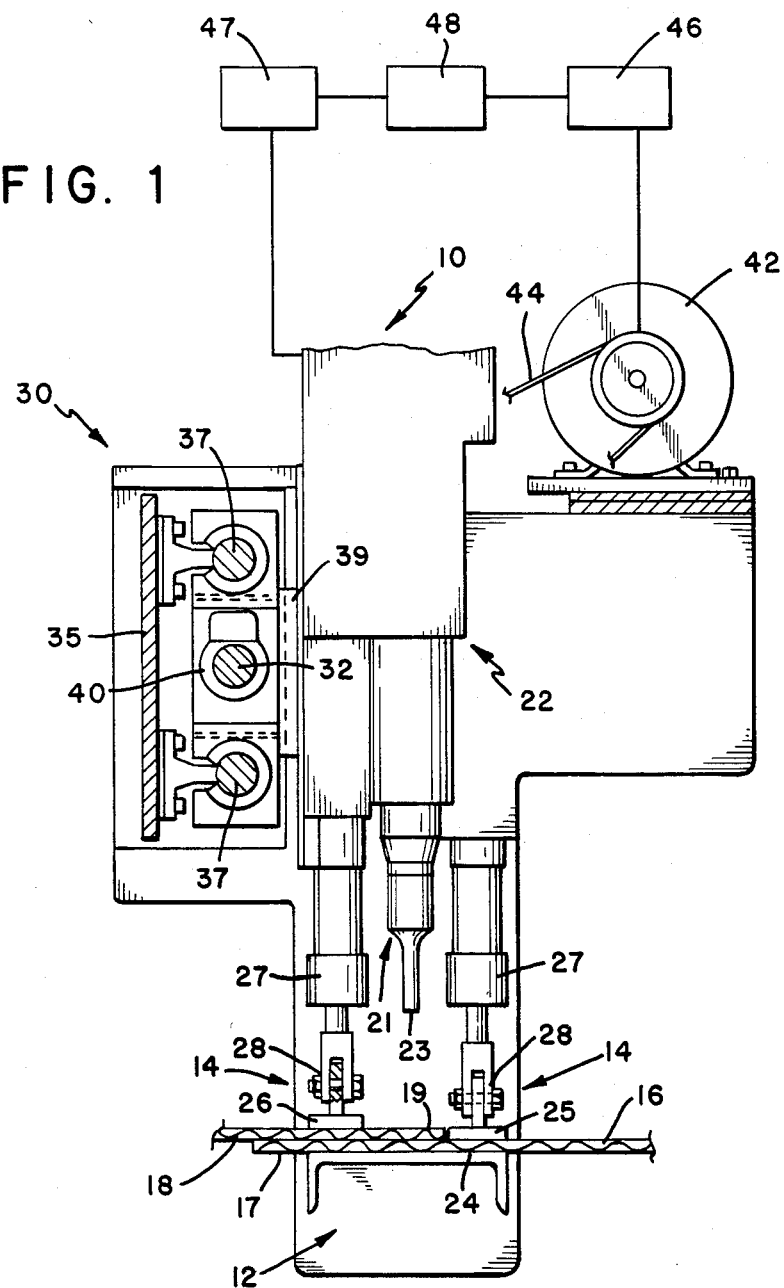
FIG. 1 is a partial schematic drawing showing the apparatus of the present invention.
Figure 2:
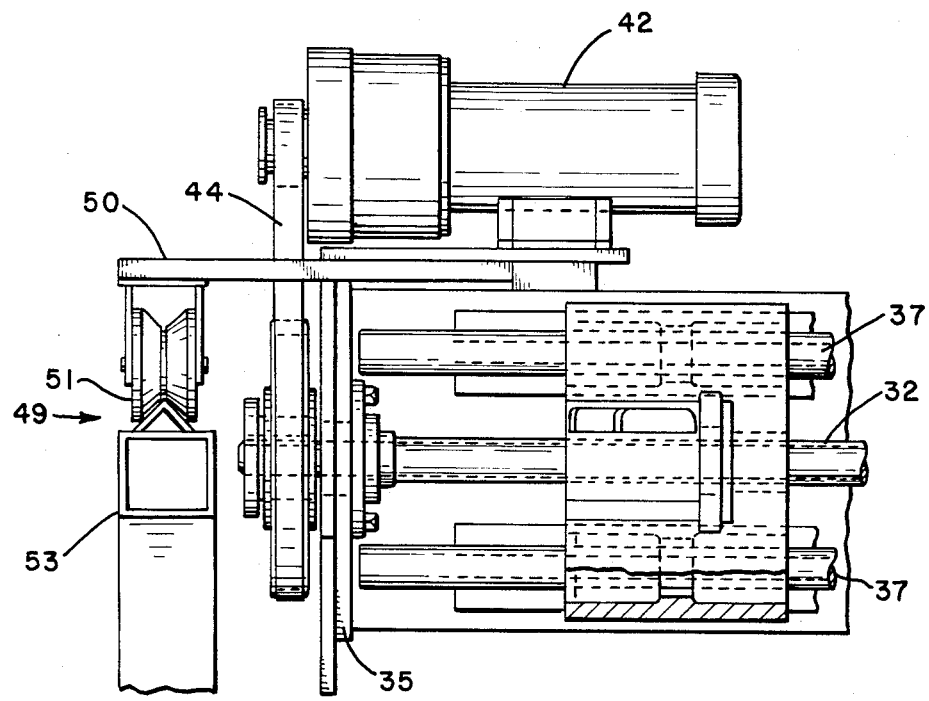
FIG. 2 is a partial schematic drawing showing a partial side view of the apparatus as drawn in FIG. 1.

The present invention will be understood by those skilled in the art by reference to FIGS. 1 and 2 which are partial sectional views of one embodiment of the apparatus of the present invention. The apparatus is for ultrasonically splicing webs. The primary elements comprise an ultrasonic welder, a web support means and a means to secure the webs between the ultrasonic welder and web support means.

The term web is used in the present invention is indicated to mean a planar sheet of material having an axial direction, a transverse direction, a leading end and a trailing end. The term leading end is to indicate that portion of the web in the neighborhood of the outside transverse edge of the web as a web is removed from a roll or the first edge to be directed into the apparatus of the present invention. The term trailing end means that portion of the web in the neighborhood of the back transverse edge of the web as the web is removed from the roll or the last portion of a web to enter the apparatus of the present invention.

The apparatus of the present invention is particularly useful for welding polymeric webs, but is not limited to polymeric webs. The apparatus can be used for a variety of webs where an ultrasonic sensitive layer can be used to bond the ends of two webs together. For example, the apparatus can be used to splice the trailing end and leading end of textile webs having an adhesive layer sensitive to ultrasonic welding between the textile webs. The apparatus of the present invention is preferably used in a method to ultrasonically weld polymeric webs. For the purposes of the present invention, polymeric webs preferably are thermoplastic webs, however, thermosetting webs which can cure and/or fuse under the influence of the ultrasonic welder can be spliced together.

Following is a detailed description of a preferred embodiment of the apparatus of the present invention made with reference to FIGS. 1 and 2. FIG. 1 shows a partial sectional view of the apparatus of the present invention in which two webs are clamped down ready to be welded together. The apparatus comprises an ultrasonic welder generally shown by reference character 10, a web support means generally shown by reference character 12, and a means to secure the webs generally shown as reference character 14. In the Figure there is shown a first web 16 having trailing end 17, and second web 18 having leading end 19.

The ultrasonic welder 10 can be any ultrasonic welder suitable for use with the webs to be welded together. The ultrasonic welder should have a means by which the welding contact point or horn 21 can be brought toward and away from the webs to be spliced. The welding horn 21 of ultrasonic welder 10 can be brought toward and away from first web 16 by use of retraction cylinder assembly 22. In the preferred embodiment of the present invention, horn 21 can be directed toward and away from the web in a direction perpendicular to the plane of the web 16. The tip of horn 21 can be a single spot or a bar extending in a direction parallel to the transverse axis of the web. The tip 23 of horn 21 can also be a plurality of spots. Where there are a plurality of spots, the spots can be in a pattern, but are preferably along a line parallel to the transverse axis of the web. The spot can have any desired shape and can be nonplanar. The preferred spot is a circular spot from one quarter to two inches in diameter and preferably one quarter to one half inch in diameter. The spot is preferably planar and parallel to the plane of the web.

The web support means 12 provides support for the portion of the webs being heated and fused by the ultrasonic welder. Preferably, the webs are fused by pressure between the horn 21 and the surface 24 of the web support means. The surface 24 of the web support means 12 corresponds to the surface of the horn 21. Preferably, the web support means 12 is an anvil having a flat anvil surface 24 parallel to the plane of the web, corresponding to flat surface of the horn 21. Where the surface of the tip of horn 21 and the web support means are flat, it is preferred the flat anvil surface 24 extend to have a greater area than the tip of horn 21. In the preferred embodiments, the flat anvil surface 24 acts as the surface to which the webs are secured by the means to secure 14.

The web support means 12 is preferably an anvil having a flat anvil surface 24. This provides support for the portion of the web being heated by the ultrasonic welder 10 and being fused, preferably under pressure, by ultrasonic welder 10.

The means to secure the webs 14 can be any suitable means by which the webs will be held together and in place during the ultrasonic welding. In the preferred embodiment as shown in FIG. 1, the means to secure the webs 14 are two clamp bars 26. The clamp bars are directed to secure the webs against the means to support 24, preferably the flat anvil surface of the means to support. It is recognized that a clamp support means independent of the means to support 12 can be used against which the webs can be secured by the clamp bars. The use of the flat anvil surface 24 is preferred as a clamp support so that the webs can be secured in the same plane in which they are supported for welding. Only one clamp bar is necessary and more than one can be used with two being preferred. The clamp bars run in a direction transverse to the axial direction of the webs. The clamp bars 26 move toward and away from the webs through the use of clamp cylinders 27 which are connected to the clamp bars by clamp coupling assemblies 28. In the preferred embodiment there is a clamp cylinder 27 at each end of each clamp bar. The clamp cylinders should be able to exert a sufficient amount of force onto the clamp bars to maintain the webs in position during the ultrasonic welding operation. Preferably, clamp cylinders 27 are pneumatic cylinders. It is recognized that any suitable means can be used to force the clamp bars in the direction toward flat anvil surface 24 so as to secure the webs in place during welding.

In a preferred apparatus for splicing polymeric webs used in the present invention, the ultrasonic welder is a spot welder. Welding horn 21 welds a small area of first web to a small area of second web. Preferably, the welding horn can then move in a transverse direction and weld additional spots along the web as desired. It is preferred that the ultrasonic welder 10 move transversely by use of an indexing means generally shown as 30. The indexing means generally comprises a means to move the spot welder transversely across the web. In FIGS. 1 and 2 this is accomplished by the use of a motor control driving screw 32. There is a means to control the transverse distance at which the ultrasonic welder stops. A welder controller 47 controls the time of the ultrasonic weld heating, and the time the ultrasonic welding pressure is exerted at each weld.

Referring to FIGS. 1 and 2, the indexing means 30 is supported by support frame 35. The support frame 35 is connected through mounting block 39 to support bars 37. The ultrasonic welder is slidably connected to support bars 37 preferably by using bearings. The ultrasonic welder 10 is connected through mounting block 39 to threaded bore 40 to driving screw 32. As the driving screw rotates in one direction or another, the ultrasonic welder 10 moves in a direction parallel to the transverse direction of the web. Driving screw 32 is connected to driving motor 42 through drive belt 44. Driving motor 42 can be controlled by a suitable electronic index controller 46 preferably a solid state integrated circuit-type controller. This controller 46 works in correspondence with a sequencing controller 48 to control the distance between welds. The extension of welding horn 21 toward the web using retraction cylinder assembly 22, the time of heating operation of ultrasonic welder 10 and the time retraction assembly 22 remains in position exerting pressure on the webs which are being spliced together are controlled by welder controller 47 upon receiving a signal to weld from sequencing controller 48. Upon completion of the weld, welder controller 49 signals sequence control 48 which then signals index controller 46 to cause the welder to index.

The apparatus of the present invention can be used to splice webs at one position relative to the axial direction, or can optionally move in the axial direction along with the webs which are being spliced. A suitable means to move the apparatus in a direction parallel to the axial direction is generally shown as 49. In FIG. 2, this axial movement means 49 is shown as axial connector bar 50 connected to support frame 35 and connected to an axial moving means such as axial rolling castor 51 which rolls along axial track 53. The movement of the ultrasonic welder assembly along axial track 53 as the web moves axially along can be controlled by suitable means (not shown).

The present invention includes a method of splicing polymeric webs having an axial direction, a transverse direction, a leading end and a trailing end using an ultrasonic welder, a web support means and a means to secure the webs. The trailing end of at least one first polymeric web is fed between the ultrasonic welder and the web support means. The leading end of at least one second polymeric web is fed between the ultrasonic welder and the web support means with the trailing end of the first polymeric web and the leading end of the second polymeric web overlapping. The first polymeric web and the second polymeric web are secured in position with the overlapping portion of the trailing end of the first web and the leading of the second web located between the ultrasonic welder and the web support means. The ultrasonic welder is then brought into contact with one side of the overlapping polymeric webs with the web support means in contact with the opposite side of the overlapping webs, opposite the welding horn of the ultrasonic welder. The overlapping polymeric webs are heated with the ultrasonic welder and fused together preferably under the pressure on the webs of the ultrasonic welding horn pressing the webs against the support means such as the flat anvil surface.

Reference is made to FIGS. 1 and 2 in describing the preferred method of splicing polymeric webs using the apparatus of the present invention. A first web 16 passes between clamp bar 26 and flat anvil surface 24 until the trailing end is between flat anvil surface 24 and clamp bar 26. At this time first clamp bar 25 presses the trailing end 17 of first web 16 against flat anvil surface 24. Second web 18 is then fed between second clamp bar 26 and flat anvil surface 24 until the edge of leading end 19 butts against first clamp bar 25. At this time second clamp bar 26 presses first web 16 and second web 18 against flat anvil surface 24. Retraction cylinder assembly 22 forces welding horn 21 into contact with the top of first web 16. A portion of flat anvil surface 24 is directly opposite welding horn 21. The ultrasonic welding horn is turned on and causes the overlapping polymer webs to heat up. Preferably the webs are heated to above the melting temperature of the polymeric material contained therein. The retraction cylinder assembly 22 forces welding horn 21 against the webs so that there is sufficient pressure exerted between welding horn 21 and flat anvil surface 24 on first web 16 and second web 18 to cause the molten polymeric materials in each web to fuse together. In the most preferred embodiment the ultrasonic welder heats the polymeric web materials for sufficient time to cause the materials to heat to at least the melting point of the polymer. The ultrasonic welder is turned off but preferably the pressure of the horn 21 against the webs continues until the fusing polymeric layers cool back to below the melting point forming a fused connection between the webs. At this time the weld is completed. As indicated above, in the preferred embodiment, the ultrasonic welder 10 is a spot welder. Therefore, in the preferred method of the present invention, the indexing means causes the ultrasonic welder 10 to move transversely across the webs. The spot welding procedure is repeatedly conducted thereby causing a plurality of spot welds transversely across the webs.

There can be a plurality of transverse weld lines across the first web and second web. Most preferably there is a transverse line of spot welds near the transverse edge of trailing end 17 of first web 16 and similarly a transverse line of spot welds near the edge of leading end 19 of second web 18. In this way the edges of the trailing end 17 and leading end 19 are secured to the adjacent webs. There should be a sufficient number of welds to enable the first web to pull the second web through the process to follow the apparatus of the present invention without the two webs separating.

The apparatus and method of the present invention can be used to splice two or more webs together which contain polymeric material. The webs can be reinforced or filled with reinforcement or filler material as known in the art.

The following example is set forth below to illustrate the nature of the invention and the manner of carrying it out. However, the invention should not be considered as being limited to the details thereof.

EXAMPLE

The apparatus shown in FIGS. 1 and 2 was used to splice together a first web 16 and a second web 17 both made of polyepsiloncaprolactam. Each web was 0.070 inches thick. The polyepsiloncaprolactam contained 50 percent by weight of polymer, 30 percent by weight of short glass fibers, and one percent of talc. The bottom side of each web, i.e., the side facing the flat anvil surface 24 was embossed. The trailing end 17 was clamped between flat anvil surface 24 and first clamp bar 25. The leading end 19 of second web 18 was clamped between flat anvil surface 24 and second clamp bar 26. The clamp cylinder used were ½ inch diameter by one inch stroke pneumatic cylinders. An ultrasonic welder, produced by Ultrasonics Division of the Dukane Corporation of St. Charles, Ill. was used. The ultrasonic model was Ultrasonic Thruster Assembly Model 48A160 having a power output of from 0 to 800 watts. The retraction cylinder assembly was set to have a horn pressure on the webs of 40 psig. The tip 23 of the horn 21 was a catenoidal horn tip, which is a circular horn having a knurled surface. The horn tip had a diameter of about ½ inch. The horn was operated at a frequency of about 20 KHz. First web 16 and second web 18 were about 50 inches wide in the transverse direction. The welder was indexed using a controlled driving motor having a clutch brake module. The driving motor was ½ horsepower D.C. motor having a clutch brake module, part number EM-50-10-20M made by Warner Electric Company. Welds were made at two inches apart. The welding time during which the ultrasonic frequency of 20 KHz was applied was for two seconds and the horn was held against the webs for an additional three seconds. During the welding there was sufficient accumulation of first web 16 in the lamination process which followed the welding apparatus to allow the assembly to remain stationary in the axial direction. However, the option existed to allow the assembly to move with the webs along axial track 53. A line of welds was made near the leading end of second web 18 and the webs were moved forward axially and reclamped so that a second line of welds was made near the trailing end of first web 16. In this way, the trailing end 17 and leading end 19 were both secured to the adjacent web. The welds were sufficiently strong so that first web and second web remained spliced together through a process to laminate them to a glass mat embedded within a molten polyepsiloncaprolactam polymer layer. Although exposed to this molten layer, the splice remained intact during the lamination process. It is noted that the lamination process conducted was of the type disclosed in U.S. Pat. No. 4,240,857.

While exemplary embodiments of the invention have been described, the true scope of the invention is to be determined from the following claims.

What is claimed is:

1. A method of splicing reinforced polymeric planar sheets having an axial direction, a transverse direction, a leading end, and a trailing end, using an ultrasonic welder and a sheet support means, there being a means to move the ultrasonic welder across the sheet, comprising the steps of:
    feeding the trailing end of at least one first polymeric sheet between the ultrasonic welder and the sheet support means;
    feeding the leading end of at least one second polymeric sheet between the ultrasonic welder and the sheet support means, with the trailing end of the first polymeric sheet and the leading end of the second polymeric sheet overlapping;
    securing the first polymeric sheet and the second polymeric sheet with the overlapping portions of the trailing end of the first sheet and leading end of the second sheet located between the ultrasonic welder and the sheet support means;
    bringing the ultrasonic welder into contact with one side of the overlapping polymeric sheets and with the sheet support means in contact with the opposite side of the overlapping polymeric sheets;
    moving the ultrasonic welder across the sheet; and
    repeatedly spot welding the overlapping polymer sheets together across the transverse direction by repeating the steps of bringing the ultrasonic welder into contact with one side of the overlapping polymeric sheets and with the sheet support means in contact with the opposite side of the polymeric sheets, heating the overlapping polymeric sheets with the ultrasonic welder 2. The method as recited in claim 1 wherein the ultrasonic welder is located between a trailing end clamp and a leading end clamp, and where the step of securing the first polymeric sheet and the second polymeric sheet further comprises:
    clamping the first polymeric sheet with the trailing end clamp with the leading end between the ultrasonic welder and the support means; and
    clamping the second polymeric sheet with the leading end claim with the leading end between the ultrasonic welder and the support means, the first polymeric sheet and the second polymeric sheet overlapping between the ultrasonic welder and the support means.

3. The method as recited in claim 1 wherein there is an indexing means to control the distance between each spot weld and a welder control means to control the time of heating and fusing during welding comprising the steps of indexing the distance in the transverse direction of each spot weld and controlling the time of heating and fusing of each spot weld.

4. The method as recited in claim 1 wherein the polymeric sheets are heated to above their melting points and fused together under pressure.

5. The method as recited in claim 4 wherein the ultrasonic welder presses the sheets together upon heating, the pressure continuing for at least the time during heating.

6. The method as recited in claim 1 wherein there is at least one line of spot welds in the transverse direction.

7. The method as recited in claim 1 wherein the web support means is an anvil extending transversely across the polymeric sheets.

8. The method as recited in claim 1 wherein the polymeric sheets are reinforced with short glass fibers.

9. An appatatus for ultrasonically welding reinforced polymeric sheets having an axial direction, a transverse dircetion, a leading end and a trailing end comprising:
    an ultrasonic welder;
    a sheet support means;
    a means to secure the trailing end of at least one first sheet and the leading end of at least one second sheet between the ultrasonic welder and the sheet support means, whereby the trailing end of the first sheet and the leading end of the second sheet overlap between the ultrasonic welder and the web support means; a means to move the ultrasonic welder twoard and away from the sheet to bring the ultrasonic welder into contact with the sheet to form spot welds; and an indexing means to control a plurality of spot welds transversely across the sheet, comprising a means to move the spot welder transversely across a sheet, a means to control distance between welds, and a means to control the time of heating and the time pressure is exterted at each weld.

10. The apparatus as recited in claim 9 wherein the ultrasonic welder is a spot welder.

11. The apparatus as recited in claim 10 wherein the ultrasonic welder further comprises a means to exert pressure on the sheets.

12. The apparatus as recited in claim 9 wherein the sheet support means further comprises:
    a trailing end clamp; and
    a leading end clamp with the ultrasonic welder and the web support means located between the trailing end clamp and the leading edge clamp.

13. The apparatus as recited in claim 12 wherein the clamps extend in the transverse direction.

14. The apparatus as recited in claim 9 further comprising a means to move the apparatus in a direction parallel to the axial direction of the sheet.

15. The apparatus as recited in claim 9 wherein the polymeric sheets are reinforced with short glass fibers.

* * * * *

UNITED STATES PATENT AND TRADEMARK OFFICE
CERTIFICATE OF CORRECTION

PATENT NO. : 4,490,199
DATED : December 25, 1984
INVENTOR(S) : F. G. Dunning

It is certified that error appears in the above-identified patent and that said Letters Patent are hereby corrected as shown below:

Col. 7, line 44, after "sheets," and before "heating" insert -- and --.

Col. 7, line 45, after "welder" insert -- . --.

Col. 7, line 52, "leading" should read -- trailing --.

Col. 7, line 55, "claim" should read -- clamp --.

Col. 8, line 23, "dircetion" should read -- direction --.

Col. 8, line 34, "twoard" should read -- toward --.

Col. 8, line 41, "exterted" should read -- exerted --.

Signed and Sealed this

Thirteenth Day of August 1985

[SEAL]

Attest:

DONALD J. QUIGG

Attesting Officer    Acting Commissioner of Patents and Trademarks